[11] 3,628,374

[72] Inventors  Helmut F. Laudien
              Gary;
              Eugene E. Smith, East Gary, both of Ind.
[21] Appl. No. 3,153
[22] Filed     Jan. 15, 1970
[45] Patented  Dec. 21, 1971
[73] Assignee  United States Steel Corporation

[54] ULTRASONIC TESTING APPARATUS
10 Claims, 10 Drawing Figs.

[52] U.S. Cl. ..................................................... 73/67.8
[51] Int. Cl. ............................................... G01n 29/00
[50] Field of Search ........................... 73/67.5–67.9, 71.5

[56] References Cited
UNITED STATES PATENTS

| | | | |
|---|---|---|---|
| 2,989,864 | 6/1961 | Bamford .......................... | 73/67.8 |
| 3,077,769 | 2/1963 | Rankin ............................ | 73/67.8 |
| 3,188,859 | 6/1965 | Greenberg et al. ............ | 73/67.8 |
| 3,257,843 | 6/1966 | Cowan ........................... | 73/67.8 X |
| 3,350,925 | 11/1967 | Coy ............................... | 73/67.8 X |
| 3,518,697 | 6/1970 | Martens ......................... | 73/67.8 X |

*Primary Examiner*—Richard C. Queisser
*Assistant Examiner*—Arthur E. Korkosz
*Attorney*—Martin J. Carroll ABSTRACT: Apparatus for ultrasonically testing a plate includes a pair of spaced-apart rails between which the plate is positioned in a horizontal plane. A crane mounted on the rails for movement therealong supports a trolley for movement transverse of the rails. The trolley carries a sonic testing wheel which contacts the top of the plate and rolls along the plate as the trolley traverses it.

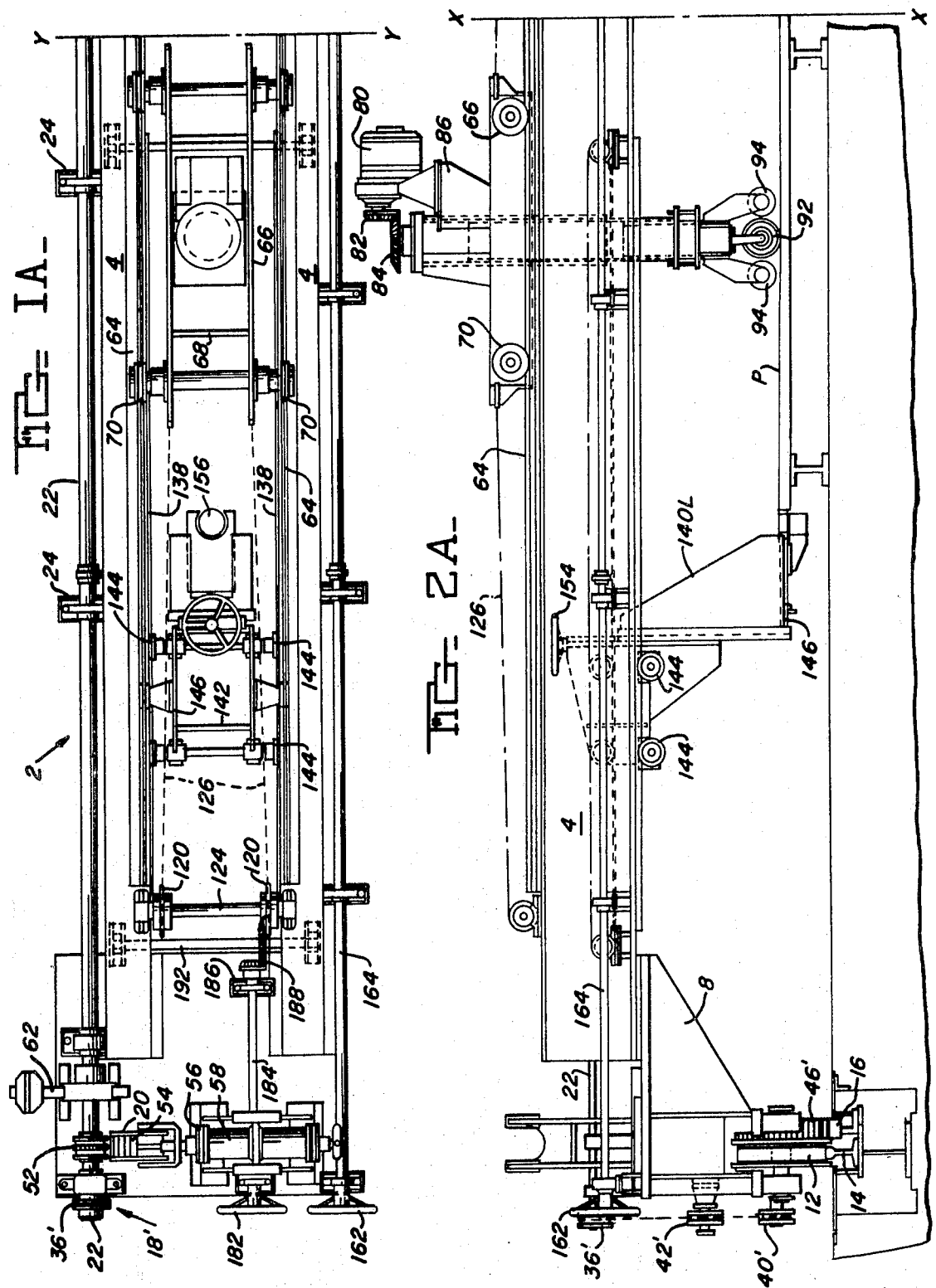

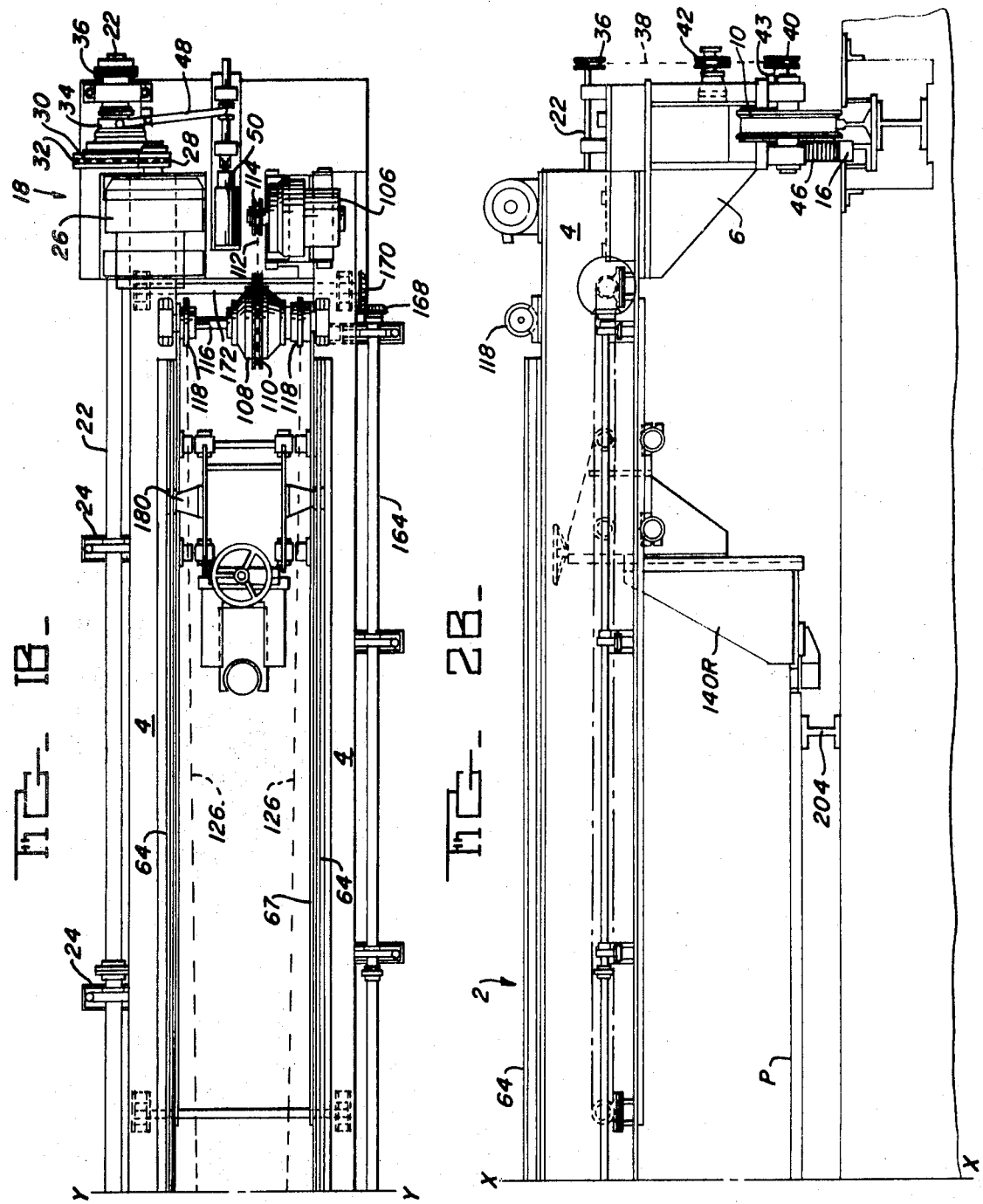

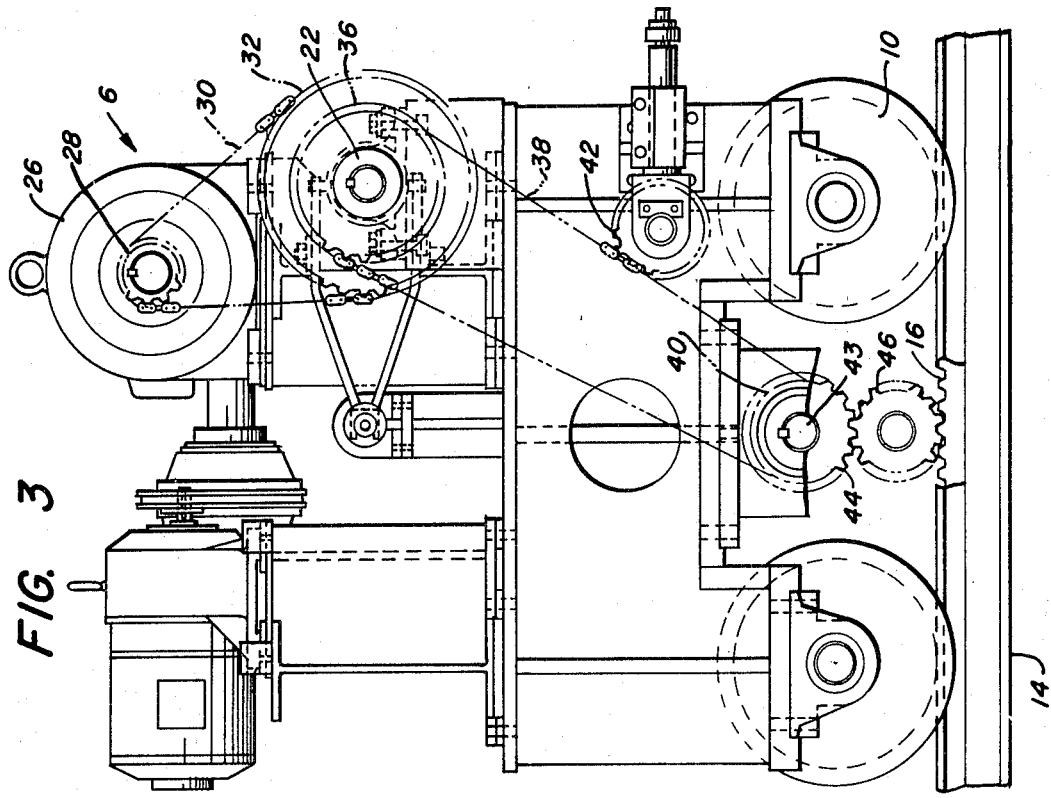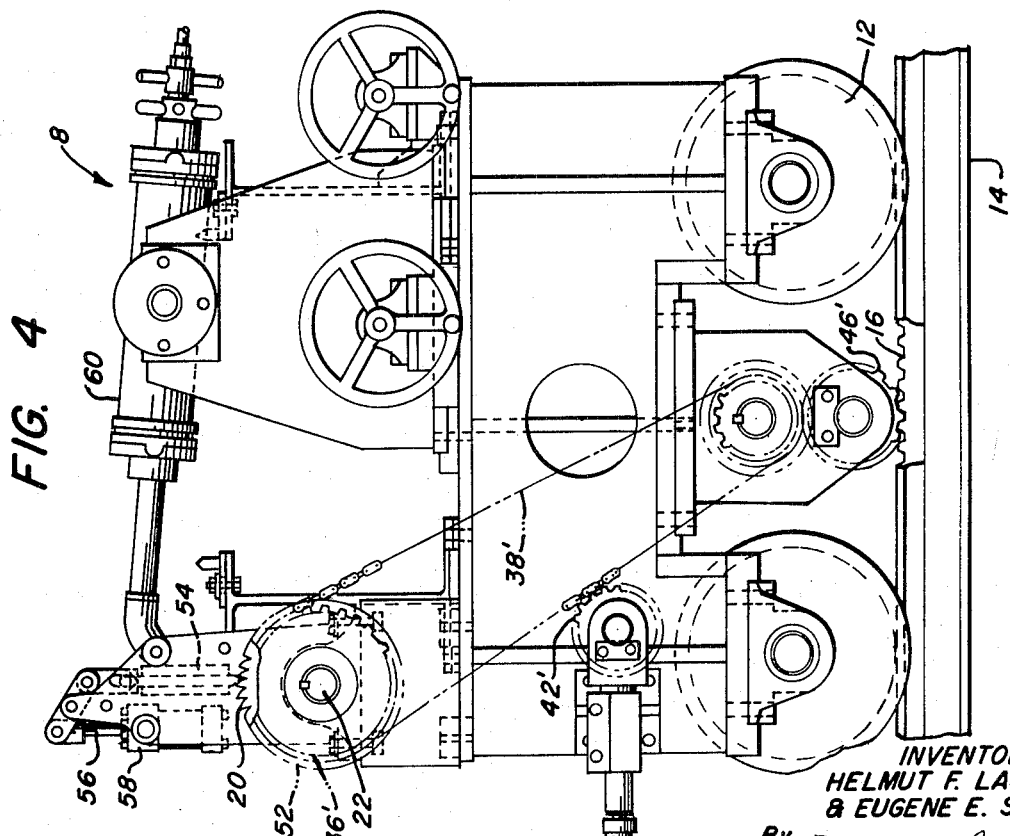

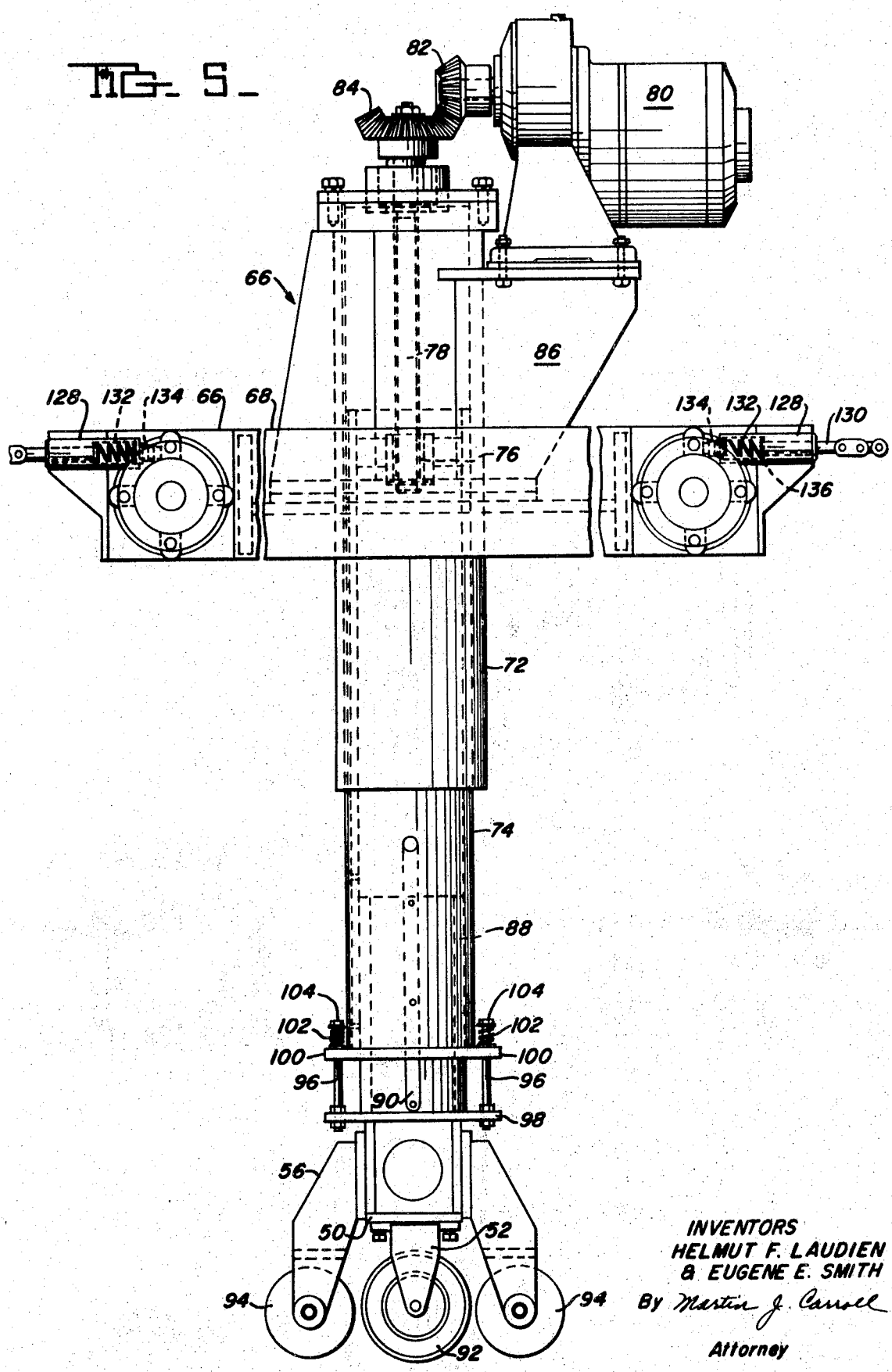

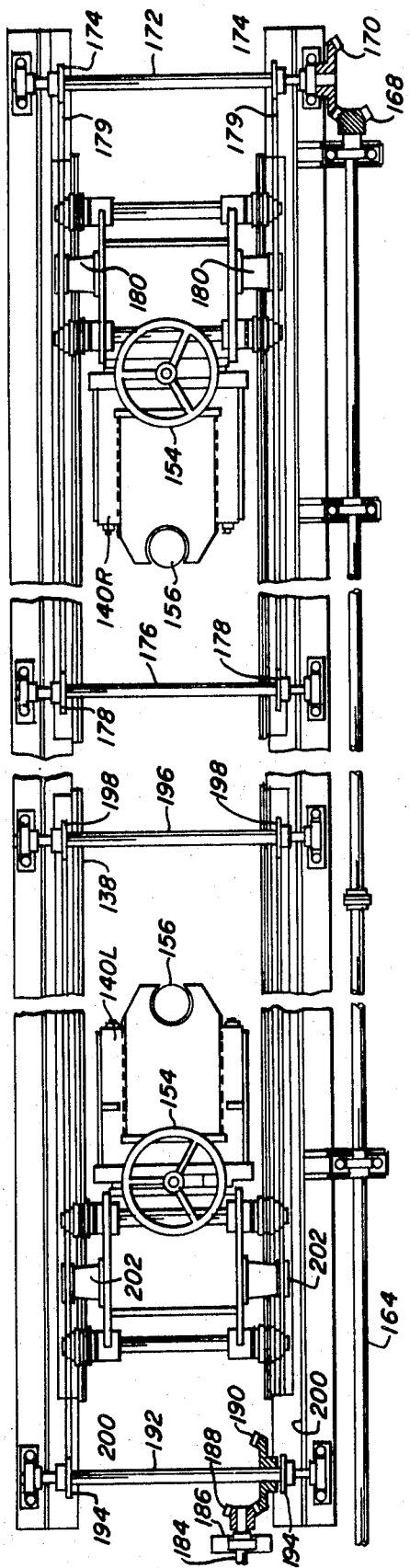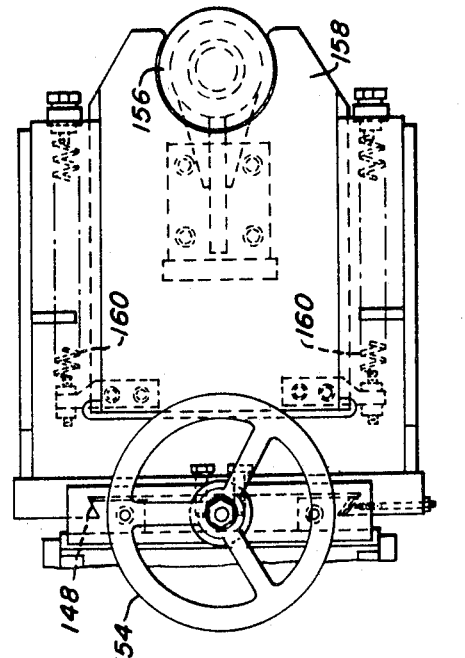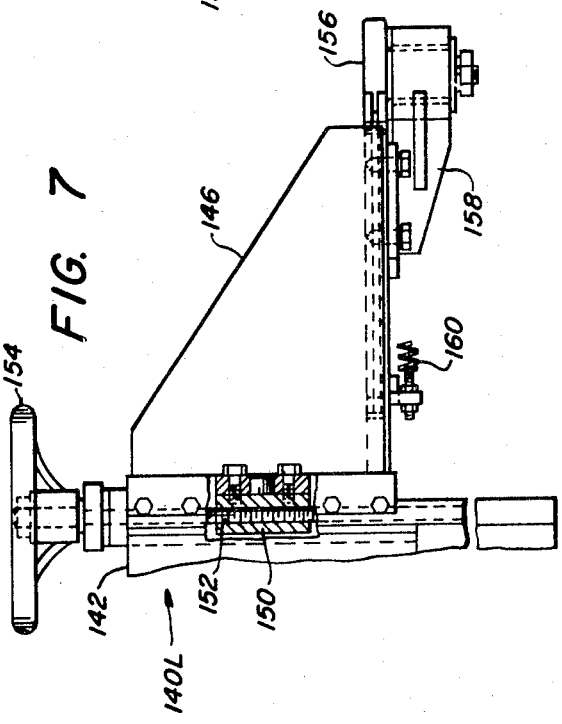
FIG. 6
FIG. 8
FIG. 7
INVENTORS
HELMUT F. LAUDIEN
& EUGENE E. SMITH
By Martin J. Cassel
Attorney

ULTRASONIC TESTING APPARATUS

This invention relates to ultrasonic testing apparatus and more particularly to such apparatus for detecting the presence and location of certain types of defects and flaws in steel plates or slabs. It is common to detect these flaws by providing a transducer to impress ultrasonic energy upon the workpiece and to receive ultrasonic energy reflected from the workpiece. The transducer is placed against the surface of the plate and a shock excited by a short pulse of electrical energy to generate a short train of ultrasonic mechanical test oscillations. This train of ultrasonic energy travels through the plate and is reflected by imperfections therein. The reflected ultrasonic energy travels back to the surface of the plate and is impressed on the transducer which transforms it into electrical oscillations which are amplified and displayed on the screen of a cathode ray tube. This display not only indicates the presence of the defect, but also the distance of the defect from the surface of the plate. It is necessary that the transducer contact a large proportion of the surface of the plate in order that all detectable flaws be detected. Prior to our invention it was necessary to use large and cumbersome structures for carrying the ultrasonic testing apparatus and to position the transducer in the required positions. In addition to being expensive the equipment required highly trained and skillful operators to obtain reasonable results and even then defects were often missed.

It is therefore an object of our invention to provide ultrasonic testing apparatus which is relatively simple and substantially foolproof in operation.

Another object is to provide such apparatus which is very stable, sensitive and accurate in operation.

These and other objects will be more apparent after referring to the following specification and attached drawings, in which:

FIGS. 1 and 1A together are a plan view of the apparatus of our invention;

FIGS. 2 and 2A together are a side elevation of the apparatus of FIGS. 1 and 1A;

FIG. 3 is an enlarged view looking toward the right end of FIG. 2;

FIG. 4 is an enlarged view looking toward the left end of FIG. 2;

FIG. 5 is an enlarged view of the trolley of FIG. 2A;

FIG. 6 is a partial plan view with parts removed to show the supporting carriage mechanism;

FIG. 7 is an enlarged elevation of a carriage of FIG. 6 with parts broken away; and FIG. 8 is a plan view of FIG. 7.

Referring more particularly to the drawings, reference numeral 2 indicates a crane which includes a pair of longitudinal beams 4 connected by end trucks 6 and 8. The end trucks 6 and 8 carry pairs of wheels 10 and 12, respectively. The wheels are supported on spaced rails 14, each having a rack 16 mounted adjacent thereto in parallel relationship. The crane 2 may be moved along rails 14 by motor-driven mechanism 18 at its right end and by similar mechanism 18' driven by hydraulically operated ratchet mechanism 20 at its left end. A line shaft 22 is supported in bearings 24 attached to one of the beams 4. The drive 18 includes a motor speed reducer 26 which drives a sprocket 28. A chain 30 passes around sprocket 28 and a sprocket 32 which is part of clutch 34. Line shaft 22 is keyed to the clutch 34. A sprocket 36 is attached to the right end of shaft 22 and through chain 38 drives a sprocket 40. The chain 38 also contacts an idler sprocket 42. Sprocket 40 is mounted on the right end of a shaft 43. A gear 44 mounted on the left end of shaft 43 drives a gear 46 which engages rack 16. The clutch 34 is operated by shifter fork 48 which is operated by an hydraulic cylinder 50. The mechanism 18' includes a sprocket 36' connected to the left end of shaft 22. The sprocket 36, through chain 38', sprocket 40', shaft 43' and gear 44', drives gear 46' which is in mesh with rack 16 adjacent the left end rail. The parts of this drive are indicated by priming the numerals for the similar parts of the right-hand drive. A ratchet wheel 52 is secured to line shaft 22 adjacent its left end and is rotated by means of pawl 54 which is operated by adjustable stroke piston rod 56 which is received in hydraulic cylinder 58. This is a conventional mechanism which enables varying the rotation of shaft 22 for each stroke of the piston. Also, part of the conventional mechanism is a retracting cylinder 60 which can retract the pawl 54 when it is desired to drive the shaft 22 by motor. A solenoid-operated brake 62 is provided on the line shaft 22 to lock the crane in place during testing operations.

Rails 64 are mounted on top of beams 4 and support a traversing trolley 66. This includes frame 68 having four wheels 70 secured thereto which are mounted on rails 64. A vertical tube or housing 72 is secured to frame 68 with a sleeve 74 slidably mounted within the tube 72 (FIG. 5). A threaded bushing 76 is secured within the upper part of sleeve 74 and receives a threaded shaft 78 which is driven from gear motor 80 through beveled gears 82 and 84. The motor 80 is supported on a bracket 86 mounted on the frame 68. A wheel carrier 88 is slidably received within sleeve 74 and is keyed thereto by means of key 90 so that it cannot rotate with respect thereto. Secured to the bottom of carrier 88 is a compressible, liquid-filled rubber sonic test wheel 92. Guide wheels 94 are supported by carrier 88 and arranged one on each side of wheel 92 in line therewith. The bottom of wheels 94 are in a horizontal plane slightly above the lower part of wheel 92 when uncompressed. The carrier 88 is suspended from sleeve 74 by means of restraining bolts 96 having their lower ends secured to a plate 98 mounted on carrier 88 and their upper ends extending through a plate 100 secured to sleeve 74 with a spring 102 between plate 100 and the head 104 of each bolt 96.

The trolley 66 is moved along rails 64 by means of a gear motor 106 which drives a flexible coupling 108 through sprocket 110, chain 112 and sprocket 114 (FIG. 1B). The coupling 108 is attached to shaft 116 which has a sprocket 118 on each end thereof. Also secured to crane 2 are a pair of sprockets 120 mounted on shaft 124 in alignment with the sprockets 118. Chains 126 pass around sprockets 118 and 120 with one end of each chain being secured to one end of trolley 66 and the other end of the chain being secured to the other end of trolley 66 by means of flexible connections 128 (FIG. 5). Each of the flexible connections includes a bolt 130 having a spring 132 surrounding one end thereof and bearing against nut 134 threaded on bolt 130 and its other end bearing against an abutment 136.

Spaced rails 138 are secured to the bottom of beams 4 on the inside thereof for supporting carriages 140R and 140L. Since the carriages are constructed in the same manner, only one will be described in detail. Each carriage includes a frame 142 having eight wheels 144, four of which wheels 144 rest on top of rails 138 and four of which bear against the bottom thereof. A platform 146 is mounted on frame 142 for slidable vertical movement through a tongue and groove connection 148. A nut 150 is secured to platform 146 and receives a threaded rod 152 held from vertical movement in frame 142 and having a handwheel 154 secured to the top thereof. Thus by turning the handwheel 154, the platform 146 may be raised or lowered. A roller 156 is secured to a bracket 158 slidably mounted on platform 146. Tension springs 160 have one end secured to platform 146 and the other end secured to bracket 158 so that the roller 156 always tends to move outwardly (FIGS. 7 and 8). The carriage 140R may be adjusted along the rails 138 by means of a handwheel 162 secured to the end of a shaft 164 mounted on one of the beams 4. A beveled gear 168 is secured to the right end of shaft 164 and is in mesh with a second beveled gear 170 secured to a shaft 172. Sprockets 174 are secured to shaft 172. A shaft 176 is mounted parallel to shaft 172 and carries sprockets 178 in alignment with sprockets 174. A chain 179 passes around each of aligned sprockets 174 and 178 and is clamped to carriage 140R by means of clamp 180. In like manner, platform carriage 140L may be adjusted by means of a handwheel 182 secured to the left end of a shaft 184 mounted in bearings 186 with a beveled gear 188 secured to the right end of the shaft. Beveled gear 188 is in mesh with a second beveled gear 190 attached to a shaft 192 with spaced sprockets 194 thereon. A shaft 196 is mounted on beams 4 parallel to shaft 192 and has sprockets 198 thereon in alignment with sprockets 194. An endless chain 200 passes around each set of aligned sprockets 194 and 198 and is clamped to carriage 140L by means of clamp 202.

In operation, the plate P to be tested is placed on skids 204 which are positioned between the rails 14 with two sides of the plate parallel to the rails 14. The length of the stroke of the piston rod 56 is adjusted to give the desired movement of the crane 2 for each stroke of the piston rod. The clutch 34 is engaged and the motor 26 energized to move the crane 2 in the desired position over the plate P. The brake 62 is then operated to lock the crane in place. The carriages 140R and 140L which have been spaced apart the maximum distance are then moved inwardly until the rollers 156 contact the sides of the plate P. If the rollers 156 are not at the correct elevation the wheels 154 are turned until the top of the wheels 156 are in the same plane as the top of plate P. The motor 80 is operated to position the sonic test wheel 92 and guide wheels 94 at an elevation where the guide wheels 94 will contact the top of the plate with the rubber wheel 92 being compressed. The traversing trolley 66 is moved along rails 64 by means of gear motor 106 to the adjustable platform carriage 140L and the top of plate P is wetted with water. The clutch 34 is released and assuming that the wheel 92 is positioned adjacent one longitudinal edge of the plate P testing may be started. If not so positioned the brake is released and the crane moved along the rails 14 by means of the ratchet mechanism 20 until it is so positioned at which time the brake will again be set. The traversing trolley 66 is then moved along rails 64 by means of gear motor 106 at its testing speed which may be 2 feet per minute. The platform 146 is of such length that the trolley 66 will reach this testing speed before wheel 92 contacts the plate P. As soon as the wheel 92 reaches the right-hand platform the motor 106 is deenergized and the trolley 66 will come to a stop on the right-hand platform. The brake 62 is then released and the crane 2 moved to the desired distance by operation of the ratchet mechanism 20. This distance may be 6 inches. The brake is then engaged and the trolley will then traverse the plate P in the opposite direction. The operation is repeated with the trolley 66 traversing back and forth until the complete surface of the plate P is covered.

While one embodiment of our invention has been shown and described, it will be apparent that other adaptations and modifications may be made without departing from the scope of the following claims.

We claim:

1. Apparatus for ultrasonically testing a plate comprising a pair of spaced apart parallel rails, means for supporting the plate to be tested between said rails, a crane supported on said rails for movement therealong, a trolley mounted on said crane for movement transversely of said rails, a sonic testing wheel mounted on said trolley adapted to contact the top of said plate, a pair of carriages mounted on said crane for longitudinal movement transversely of said rails, one on each side of said trolley, and a vertically adjustable platform mounted on each carriage, said carriages being adapted to be positioned to engage the longitudinal sides of said plate with their top at substantially the same level as the top of said plate so as to receive said testing wheel.

2. Apparatus according to claim 1 in which each of said platforms includes a roller mounted with its axis vertical on the end of the platform toward the other platform and its top at substantially the same level as the top of the rest of the platform, and resilient means for urging said roller toward the other platform so as to engage the adjacent longitudinal side of said plate.

3. Apparatus according to claim 2 including means for driving said crane along said rails, means for driving said trolley transversely of said rails, means for driving said carriages transversely of said rails, and means for moving said platforms vertically.

4. Apparatus according to claim 1 including a vertical tube secured to said trolley, a sleeve slidably supported on said tube, means for raising and lowering said sleeves, a carrier slidably mounted in said sleeve with said testing wheel mounted on the bottom thereof, resilient means for limiting movement of said carrier with respect to said sleeve, and a guide wheel mounted on said carrier on each side of said testing wheel, the axes of said testing wheel and said guide wheels being parallel to said rails.

5. Apparatus according to claim 1 including means for driving said crane along said rails, means for driving said trolley transversely of said rails, means for driving said carriages transversely of said rails, and means for moving said platforms vertically.

6. Apparatus according to claim 5 including a vertical tube secured to said trolley, a sleeve slidably supported on said tube, means for raising and lowering said sleeves, a carrier slidably mounted in said sleeve with said testing wheel mounted on the bottom thereof, resilient means for limiting movement of said carrier with respect to said sleeve, and a guide wheel mounted on said carrier on each side of said testing wheel, the axes of said testing wheel and said guide wheels being parallel to said rails.

7. Apparatus according to claim 5 in which said means for driving said crane along said rails includes a rotatable drive shaft extending along said crane between said rails, a motor for rotating said drive shaft, a rack adjacent each rail parallel thereto, a gear in mesh with each rack, and a drive connection between said drive shaft and each gear.

8. Apparatus according to claim 7 including a vertical tube secured to said trolley, a sleeve slidably supported on said tube, means for raising and lowering said sleeves, a carrier slidably mounted in said sleeve with said testing wheel mounted on the bottom thereof, resilient means for limiting movement of said carrier with respect to said sleeve, and a guide wheel mounted on said carrier on each side of said testing wheel, the axes of said testing wheel and said guide wheels being parallel to said rails.

9. Apparatus according to claim 7 including means for disconnecting said motor from said drive shaft, and a ratchet drive connected to said drive shaft for moving said crane a predetermined amount.

10. Apparatus according to claim 9 including a vertical tube secured to said trolley, a sleeve slidably supported on said tube, means for raising and lowering said sleeves, a carrier slidably mounted in said sleeve with said testing wheel mounted on the bottom thereof, resilient means for limiting movement of said carrier with respect to said sleeve, and a guide wheel mounted on said carrier on each side of said testing wheel, the axes of said testing wheel and said guide wheels being parallel to said rails.

* * * * *